US00RE49250E

(19) United States
(12) Reissued Patent
Earp

(10) Patent Number: US RE49,250 E
(45) Date of Reissued Patent: Oct. 18, 2022

(54) BLASTING FLUID EFFLUENT CONTAINMENT DEVICE

(71) Applicant: Danny Earp, La Porte, TX (US)

(72) Inventor: Danny Earp, La Porte, TX (US)

(21) Appl. No.: 16/987,380

(22) Filed: Aug. 6, 2020

Related U.S. Patent Documents

Reissue of:
(64) Patent No.: 10,195,651
Issued: Feb. 5, 2019
Appl. No.: 15/054,651
Filed: Feb. 26, 2016

U.S. Applications:
(60) Provisional application No. 62/121,963, filed on Feb. 27, 2015.

(51) Int. Cl.
*B08B 9/093* (2006.01)
*B65D 30/08* (2006.01)
*B08B 17/02* (2006.01)

(52) U.S. Cl.
CPC ..... *B08B 9/093* (2013.01); *B08B 17/025* (2013.01); *B65D 31/02* (2013.01)

(58) Field of Classification Search
CPC ..... B08B 9/093; B08B 17/025; B65D 31/02
USPC ..... 383/41, 119, 72, 75
See application file for complete search history.

(56) References Cited

U.S. PATENT DOCUMENTS 3,135,458 A * 6/1964 Steuart ..... E03F 7/00 383/41
3,374,929 A 3/1968 Silfverskiold
3,896,991 A * 7/1975 Kozlowski ..... B32B 7/02 383/116
4,149,755 A * 4/1979 Handleman ..... B65D 88/72 137/527.8
4,364,424 A * 12/1982 Nattrass ..... B65D 88/1668 222/181.3
4,707,969 A * 11/1987 Marino ..... B08B 17/025 53/449
4,718,925 A * 1/1988 DeMarco ..... A47L 9/1418 55/367
4,749,391 A * 6/1988 DeMarco ..... B01D 46/02 55/367
4,781,475 A * 11/1988 LaFleur ..... B65D 88/1612 383/119
4,903,859 A 2/1990 Derby et al.
4,946,478 A * 8/1990 Davis ..... B01D 46/00 383/102
5,244,281 A 9/1993 Wiliamson et al.
(Continued)

FOREIGN PATENT DOCUMENTS

EP 0 495 739 7/1992
EP 0495739 B1 3/1995
WO WO 9212849 A1 8/1992

*Primary Examiner* — William C Doerrler
(74) *Attorney, Agent, or Firm* — Condo Roccia Koptiw LLP

(57) ABSTRACT

This disclosure relates to a system and method for handling effluent during a hydroblasting operation of a vessel. The system includes a bag assembly comprising a containment bag and a drain. A throat opening is configured to interface with an end of a vessel. The sidewall extends approximately longitudinally from the throat opening. The sleeve is located substantially circumferentially around the containment bag near the throat opening and is formed of a resilient, anti-static material.

26 Claims, 6 Drawing Sheets

(56) References Cited

U.S. PATENT DOCUMENTS

| | | | | |
|---|---|---|---|---|
| 5,725,009 | A * | 3/1998 | Mallow, Sr. | F16L 55/18 137/15.09 |
| 7,334,587 | B2 | 2/2008 | Lake | |
| 7,753,090 | B2 | 7/2010 | Earp | F16L 55/00 141/86 |
| 10,144,628 | B1 * | 12/2018 | Hardy | B65D 33/14 |
| 2006/0266390 | A1 * | 11/2006 | Lake | F28G 15/00 134/104.2 |
| 2014/0270594 | A1 | 9/2014 | Holdstock et al. | |
| 2015/0122355 | A1 * | 5/2015 | Earp | B08B 17/025 137/565.37 |

* cited by examiner

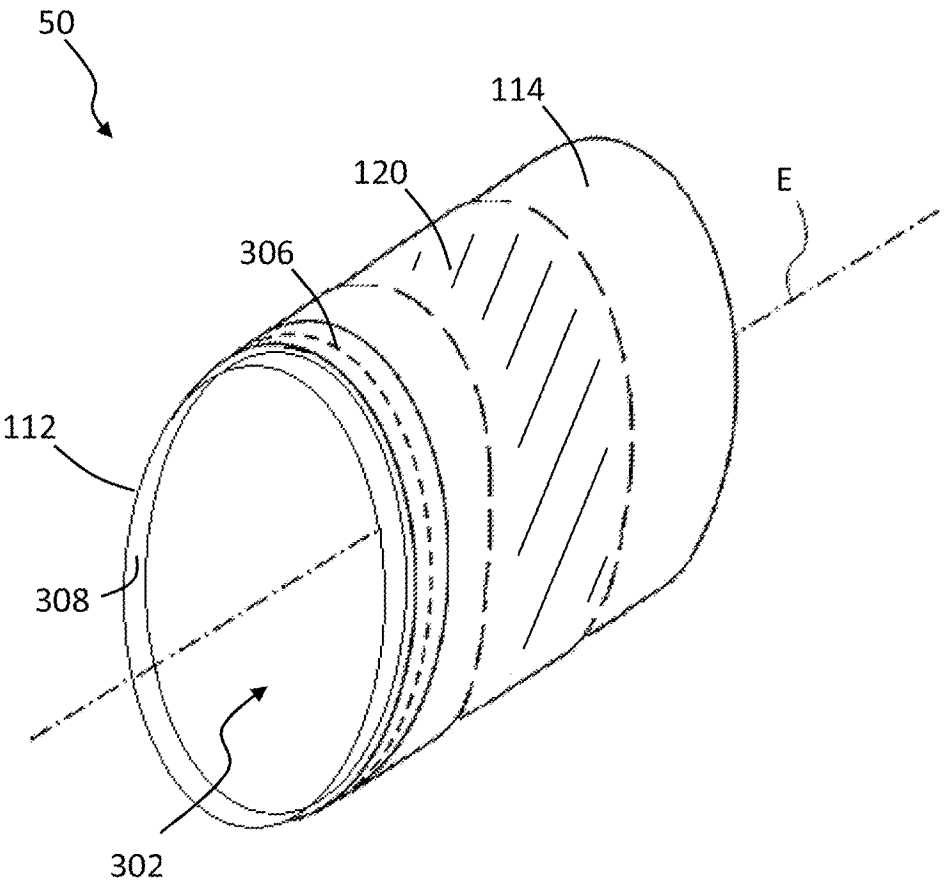
FIG. 3A
AMENDED

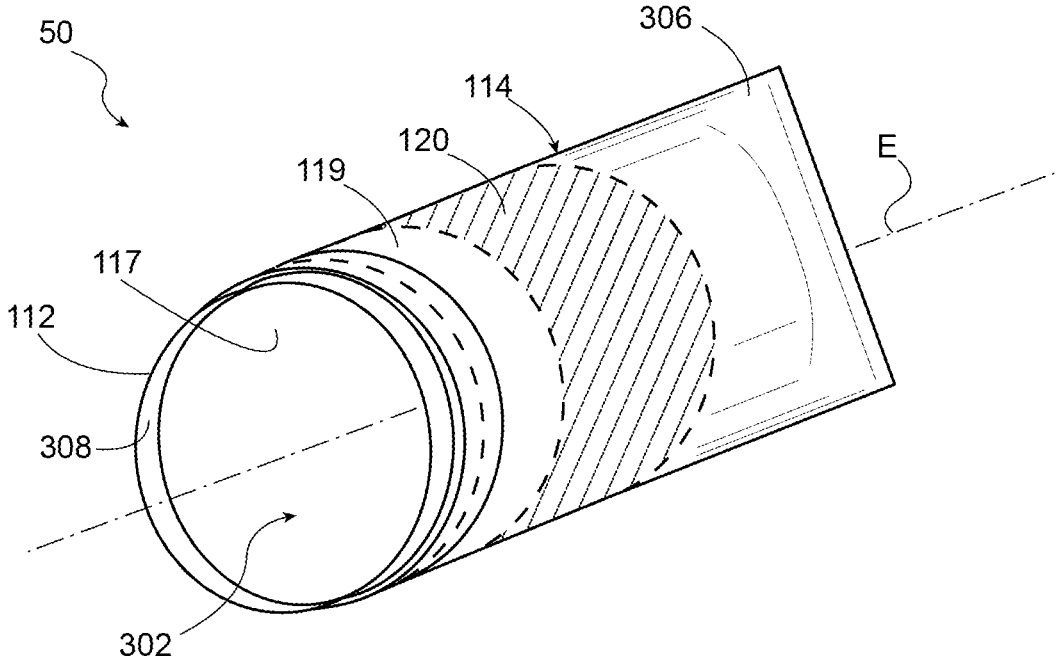
FIG. 3B
NEW

BLASTING FLUID EFFLUENT CONTAINMENT DEVICE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application *is a reissue of U.S. application Ser. No. 15/054,651, which issued as U.S. Pat. No. 10,195,651, on Feb. 5, 2019, which* claims priority to U.S. Provisional Application No. 62/121,963, filed Feb. 27, 2015, which is hereby incorporated in [its entirety] *their entireties* by reference.

TECHNICAL FIELD

This disclosure relates generally to a system and method related to hydroblasting operations, and more particularly, to a system and method for handling effluent during a hydroblasting operation of a vessel.

BACKGROUND

Containment devices for handling effluent from a hydroblasting operation are known. For example, U.S. Pat. No. 7,753,090, entitled Blasting Fluid Effluent Containment Device, which is assigned to the assignee of the present invention, and which is incorporated herein by reference in its entirety, discloses an effluent containment bag having a drain. U.S. Pat. No. 7,334,587, entitled "Fluid Containment Assembly For Use In Hydroblast Cleaning," discloses a rigid end shield that is spaced from and axially aligned with the downstream end of the heat exchanger and a rigid annular shield that surrounds the area between the end shield and the end of the heat exchanger. A waterproof flexible shroud is disposed about the shield portions of the assembly.

The inventors of the present invention have identified problems of the prior art effluent handling devices. First, some hydroblasting operations employ a wand that sprays high pressure water at an oblique angle to the longitudinal axis of the wand. Some vessels, such as some heat exchangers, have tubes that extend though the length of the outer housing. Hydroblast cleaning sometimes requires the jet or even the wand to extend out the distal end of the vessel, which in some configurations results in high pressure spray impinging directly onto the surface of the bag. Second, the inventors surmise that spray and/or effluent flowing over conventional plastic effluent container material can produce a build-up of static electricity, such as by the triboelectric effect.

Regarding static build up generally, if a surface of the material is electrically charged, either negatively or positively, contact with an uncharged conductive object or with an object having substantially different charge may cause an electrical discharge of the built-up static electricity. Sparks from the electrical discharge can ignite flammable vapours. The inventors are not aware of any commercial application of anti-static agents used in hydroblast cleaning.

In general, in other applications, an antistatic agent is sometimes used to treat materials or their surfaces in order to reduce or eliminate buildup of static electricity from the triboelectric effect. Some agents work by making the surface or the material less conductive. Some antistatic agents are themselves conductive. Internal antistatic agents are designed to be mixed directly into the material, external antistatic agents are applied to the surface.

Many common antistatic agents are based on long-chain aliphatic amines (optionally ethoxylated) and amides, quaternary ammonium salts (e.g., behentrimonium chloride or cocamidopropyl betaine), esters of phosphoric acid, polyethylene glycol esters, polyols, or indium tin oxide or antimony tin oxide. It is also possible to use conductive polymers, like PEDOT:PSS and conducting polymer nanofibers, particularly polyaniline nanofibers.

The foregoing background discussion is not intended to limit the innovations described herein, nor to limit or expand the prior art discussed. Thus, the foregoing discussion should not be taken to indicate that any particular element of a prior system is unsuitable for use with the innovations described herein, nor is it intended to indicate that any element is essential in implementing the innovations described herein. The implementations and application of the innovations described herein are defined by the appended claims.

SUMMARY

The inventors, having first recognized the above problems, address them with an embodiment of the present disclosure that includes a bag assembly for handling effluent from a hydroblasting operation. The present invention relates generally to a system and method for handling effluent from a hydroblasting operation. The system includes a bag assembly which is configured to be attached to or wrapped around an open pipe or flange of a vessel that is to be cleaned. During a hydroblasting operation, high pressure fluid is sprayed on the interior of the pipe to clean or otherwise remove deposits, by-products, waste, and the like. The effluent, which flows out of the pipe during an operation, and the spray that directly impinges on the bag, is collected and/or contained within the bag assembly. The collected liquid may be removed with the assembly or drained out of the assembly during or after the operation. The bag assembly may include a protective sheet or insert that protects the bag material from the high pressure fluid being sprayed into the pipe. Additionally, the assembly may have anti-static capabilities to reduce the risk of igniting vapor in the instance where the fluid may be flammable.

The bag assembly includes a containment bag and a drain in the containment bag. The containment bag includes a throat opening, a sleeve, and a sidewall that extends approximately longitudinally from the throat opening. The throat opening is configured to interface with an end of the vessel. The sleeve is formed of a resilient material, located substantially circumferentially around the containment bag near the throat opening. The sleeve is configured to resist direct impingement by hydroblasting fluid directly from a hydroblasting wand. The drain is configured to enable draining of the fluid collected in the containment bag.

Another embodiment of the present disclosure includes a method for hydroblasting the vessel and handling hydroblasting effluent. The method includes installing a throat opening of a containment bag over an end of a vessel. The bag includes a sidewall and a sleeve that is formed of a resilient material and located substantially circumferentially around the containment bag near the throat opening, such that a sleeveless portion of the sidewall is constrained to the vessel end. The method further includes hydroblasting the vessel such that a portion of the hydroblasting fluid impinges on the sleeve region. The method further includes enabling the effluent collected in the bag to drain through a drain connection. The bag may include antistatic capabilities.

The present invention is not limited to the features listed above, nor is the invention limited to any or both problems described above. Rather the present invention is intended to broadly cover the inventive concepts and their variations as would be understood by a person familiar with the technology disclosed herein, or as reflected in the claims.

FIG. [3] *3A* is an illustration of a perspective view of a bag assembly, according to an embodiment of this disclosure.

*FIG. 3B is an illustration of a perspective view of a bag assembly, according to another embodiment of this disclosure.*

Figure 4:
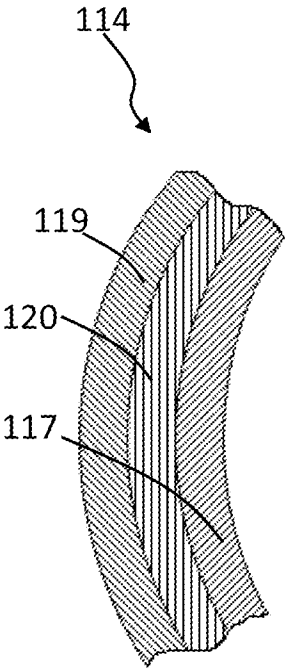

FIG. 4 is a cross sectional view of a side wall of a bag assembly, according to an embodiment of this disclosure.

Figure 5:
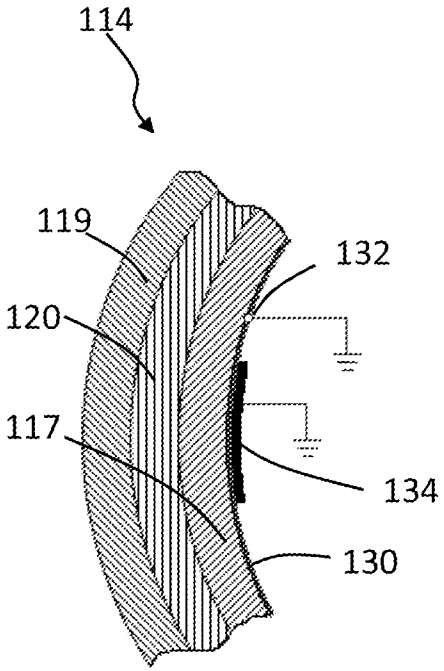

FIG. 5 is a cross sectional view of a side wall of a bag assembly with a coating, according to an embodiment of this disclosure.

DETAILED DESCRIPTION OF ILLUSTRATIVE EMBODIMENTS

Figure 1:
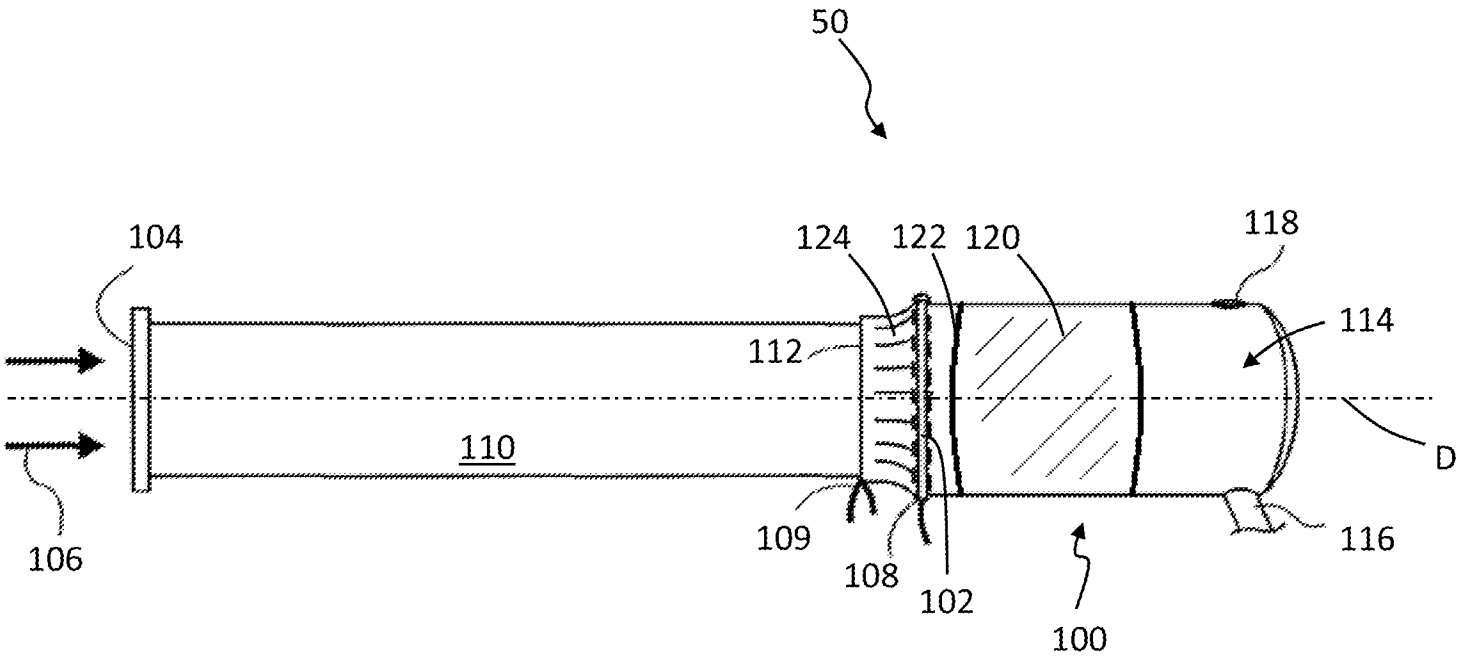
FIG. 1 is an illustration of a bag assembly installed on a heat exchanger type vessel at its end fitting, and its horizontal configuration.
Figure 2:
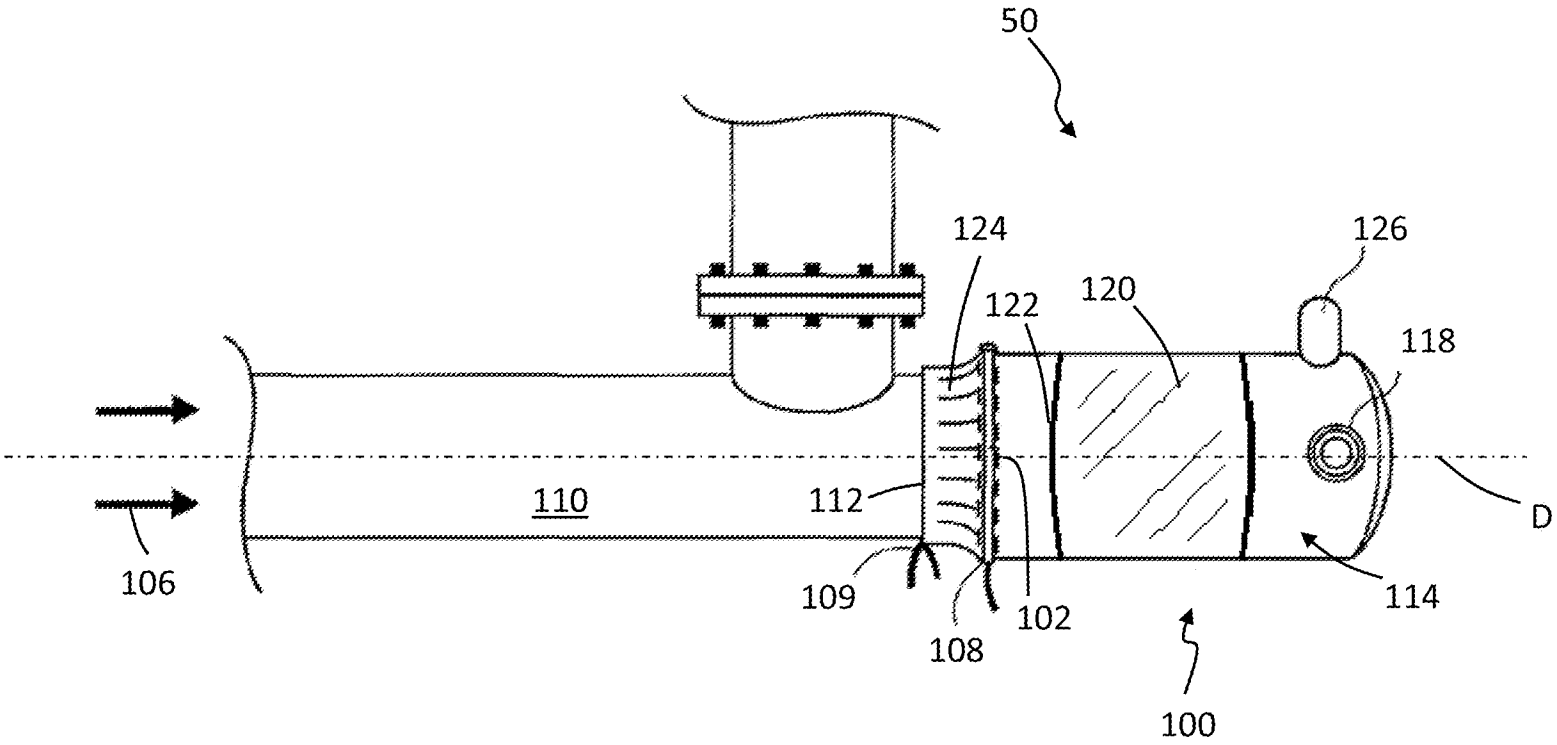
FIG. 2 is an illustration of a bag assembly installed on a heat exchanger type vessel at an "inline" type end fitting.

FIGS. 1, 2, and 3 illustrate a blasting fluid containment bag assembly 50 according to an aspect of this disclosure. The containment bag assembly 50 comprises a protective sleeve or wrap 120 and a (preferably) flexible containment bag 100 that has a throat opening 302, a body or sidewall 114, a closed end 306, and a drain port 116.

The throat opening 302 interfaces with an open end 102 of the vessel 110 being cleaned by hydroblasting. The open end 102 of the vessel 110 is opposite the operations or front end 104 of the vessel 110 where a fluid jet 106 is introduced into the vessel 110. Closed end 306 preferably is a single seam in bag 100 formed by pinching the bag material from its circular cross sectional shape to a single line and affixing the sides by conventional means, *as schematically illustrated in FIG. 3B*.

A leading edge 112 of the bag 100 may be drawn closed by a drawstring 109 around the circumference of the vessel 110, as needed by the particular parameters of the application. Drawstring 109 provides a means to securely cinch bag 100 against a flange or outer sidewall of vessel 110. In this regard, the drawstring 109 is configured to tighten a sleeveless portion 124 of the sidewall 114 on the open end 102 of the vessel 110. An optional, second flange strap 108 may be located proximate the bag opening to cinch bag 100 against the flange or outer sidewall of the vessel 110. Drawstring 109 encompasses any structure that enables cinching, such as straps, buckles, and the like. The cinched structure provides a splash guard and supports the proximal end of assembly 50 to enable effluent to be collected (including both liquid and vapor) and contained in an interior space of the bag 100.

Vessel 100 as illustrated is a heat exchanger having longitudinal (that is, horizontal in the orientation of the figures) tubes. The present invention is not limited to horizontal-tube heat exchangers, but rather encompasses any hydroblast and like cleaning.

Effluent collected in the interior space of the containment bag 100 is drained from the bag 100 via drain port 116 disposed in the bag body 114 proximate the bottom of the bag 100. Optionally, there may also be an overflow drain 126 disposed about 45 to 60 degrees radially from the drain 116. The overflow drain 126 serves as a backup or secondary drain if the effluent level in the interior space of the bag 100 becomes too high. A vent 118 may also be provided, and is disposed in the bag sidewall 114 proximate the top of the bag 100. The vent 118 relieves any pressure buildup, positive or negative, that may tend to accumulate in the interior of the bag 100. Optionally, there may also be an expansion means provided to hold the containment bag 100 in an expanded condition during use, which may help minimize back pressure that otherwise may be present.

The bag sidewall 114 includes an inner sidewall 117 and an outer sidewall 119. The inner sidewall 117 is positioned inboard of the outer sidewall 119 and may define the interior space within the bag 100. The outer sidewall 119 may be positioned on the outside of the inner sidewall 117 (that is, outer sidewall 119 forms the outermost layer of bag 100), thereby creating a two layered bag wall 114. Bag sidewall 114 may be formed of conventional material, such as a flexible layer of nylon reinforced polyethylene. In this regard, bag 100 may be formed from a flat sheet of nylon reinforced material and a flat sheet of HDPE of the appropriate size. The flat sheets are rolled together to form sidewall 114 having wrap 120, which is formed into a finished bag 100 by conventional techniques.

Sleeve 120 is cylindrical at least approximately to the extent that bag 100 is cylindrical. Sleeve 120 as illustrated in schematically in FIG. [3] *3A* is located on the inside surface of bag 100 such that hydroblasting spray can impinge directly on sleeve 120. Sleeve 120 may be located longitudinally near but having a proximal end that is spaced apart from opening 302 to form the sleeveless portion 124 of sidewall 114. Sleeveless portion 124 may be more flexible than the portion with sleeve 120 to ease mating between open end 302 and open end of vessel 110. Sleeve 120 may extend rearward to closed end 306 by a length (that is, in the longitudinal direction) chosen according to the parameters of the particular installation. Sleeve or wrap 120 preferably has the attributes of being resistant to high pressure water impingement and flexible enough for handling and shipping. In this regard, the sleeve 120 preferably is resilient such that it can be substantially folded or rolled for shipping and retain an unfolded circular shape upon installation of the bag assembly onto a vessel. For example, a 30 mil sheet of HDPE may be used, and the thickness and materials may be chosen according to the parameters of the installation, such as diameter and length of the sleeve and blast bag, hydroblast fluid pressure, and the like. The thickness of the sheet may vary according to the particular parameters of the application, such as between 10 and 50 mils. Wrap 120 may alternatively be sandwiched between an inner wall 117 and an outer wall 119, as illustrated schematically in FIG. 4. Wall 114 may be formed by rolling a flexible sheet for approximately two revolutions at the desired diameter with sleeve material rolled between the inner and outer surfaces such that sleeve 120 is between inner wall 117 and outer wall 119, wall 114 may be rolled around a cylindrical sleeve 120 such that sleeve 120 is on the inboard side of wall 114, or other method of forming or configuration. The term "sleeve" is used to include both a continuous shape, such as a cylinder having a longitudinal cross section that is continuous, and an overlapping shape, such as a roll that in longitudinal cross section forms a spiral shape.

Containment bag wall 114 is made of a water impermeable material that (preferably) is flexible to enable it to be shipped and manipulated into place on vessel 110, as described above. In the illustrated embodiment, the containment bag 100 is substantially cylindrical and mounted longitudinally along axis D. Axis D extends from the front end 104 to the open end 102 of the vessel 110, and is aligned perpendicular to the opening of the open end 102 of the vessel 110. The bag wall 114 extends approximately longitudinally along axis D away from the open end 102, in the opposite direction of the vessel front end 104. Although the containment bag 100 is illustrated as having a substantially circular cross-section, other cross-sectional configurations of the bag 100 are practical, including, for example, triangular or rectangular cross-sections. Additionally, the bag 100 may contain an expansion plate (not shown) which is used to hold the interior of the bag 100 in an expanded condition. The expansion plate may be disposed within the bag 100 on the interior of the bag wall 114. A support rod (not shown) may also be used to hold the bag in a horizontal position along axis D. Once effluent is collected in the containment bag 100, the drain 116 may be used to drain the effluent from the interior of the bag 100. The drain 116 may be positioned such that gravity will force the effluent through the drain 116, as opposed to the use of a pump (not shown).

The vent 118 is disposed on the containment bag 100 to relieve any pressure that may develop in the interior of the bag 100 during use. Because the pressure condition of the effluent as it exits the open end 102 of the vessel 110 can be variable, absent a venting mechanism, positive pressure may develop in the interior space of the bag 100 and cause a back pressure of the effluent. Further, it is possible in certain circumstances that the draining process could create a negative pressure in the bag 100, causing the walls to collapse and reduce the empty volume of the interior space. The vent 118 is intended to alleviate both of these issues. The vent 118 may also include vapor traps (not shown), to reduce or eliminate emission of contaminated or hazardous chemical vapors. Any vapor trap that is commonly known in the art may be used with the present disclosure. The vent 118 may also be configured to close.

In an alternative embodiment, the bag opening 302 of the containment assembly 50 does not have to comprise the entire cross-section of the interior of the bag 100. The bag opening 302 may be smaller than the cross-section of the interior of the bag 100, but the plane of the bag opening 302 may be substantially perpendicular to the longitudinal axis E. The longitudinal axis E may be parallel to the longitudinal axis D when the containment assembly 50 is attached to the vessel 110.

Prior to a hydroblasting operation, the throat opening 302 of the containment bag 100 is installed over the front end 104 of the vessel 110. The sleeveless portion 124 (where present) of the bag 100 is constrained to a sidewall of the vessel 110, thereby restricting the fluid from exiting the vessel 110 or bag 100.

The containment assembly 50 is configured to contain effluent used during a hydroblasting operation. A hydroblasting operation uses a hydroblasting fluid under extreme pressure, which may include a blast of water, with an added abrasive, to remove grime or other deposits from the interior of the vessel 110. The fluid and debris may also consist of hazardous materials. A hydroblasting wand may be used to spray the fluid at a working pressure of at least 10,000 psi and up to, or exceeding, 40,000 psi. During and after the interior of the vessel 110 is blasted, the effluent may flow into and be contained within the containment bag 100. The fluid may be removed either through the drain 116, or by removing the bag assembly 50 from the vessel 110.

During a blasting operation, the high pressure hydroblasting fluid may come in contact with and impinge the containment assembly 50. The pressure of the fluid may be so extreme that it could cut through many materials, including plastic, rubber, nylon, or the like, allowing the fluid, and potentially hazardous material, to leak from the containment bag 100.

Wrap 120 is configured to resist direct impingement of the hydroblasting fluid. The region of the containment assembly 50 that has the protective wrap 120 disposed on or within, referred to as the sleeve region, may be impinged by the hydroblasting fluid. If the hydroblasting wand directly sprays the containment assembly 50, the sleeve region is intended to protect the bag 100 from tearing or ripping. This allows the hydroblasting fluid to be collected and contained within the bag 100. The sleeve 120 may be located substantially circumferentially around the containment bag 100 near the throat opening 302.

Hydroblasting is generally a technique to use when cleaning a variety of vessels in order to avoid sparks or ignition. However, the inventors have identified a risk when hydroblasting—that is, electric discharge sparks can occur and can cause an explosion when they come in contact with flammable fluids or gasses. Therefore, in an embodiment of the present disclosure, the containment bag assembly 50 may be constructed with anti-static materials or other anti-static capabilities in order to avoid an unexpected electric discharge.

In some cases, the sidewall 114 that extends longitudinally from the throat opening 302 is made of a conventional anti-static material, as will be understood by persons familiar with anti-static polymers, to inhibit a build-up to static charged from the blasting fluid onto the bag assembly. The compounds or materials disclosed in the Background section may be employed in any combination. In an alternative embodiment, the sidewall 114 may include an anti-static coating, schematically shown by reference numeral 130 in FIG. 5, such that allowing the material substrate of the bag 100 to be made of any resilient material and still have anti-static properties.

Additionally or alternatively, the bag assembly 50 may include a grounded, conductive wire, schematically identified by reference numeral 132 in FIG. 5. Wire 132 may be spiral wound on the inboard surface of wall 114 and/or sleeve 120, or may be a wire or wire mesh embedded in wall 114 and/or sleeve 120 to conduct away static electricity. In this regard, wire 132 preferably is connected to a ground. Alternatively, the bag assembly 50 may include a grounded metal foil 134 coupled to the sidewall 114 of the bag 100. The grounded metal foil 134 may provide the same benefit as the grounded wire 132. The anti-static features may be employed in any location, including at or near the outermost layer, within the layers, or at or near the innermost layer.

While the disclosure is described herein using a limited number of embodiments, these specific embodiments are not intended to limit the scope of the disclosure as otherwise described and claimed herein. Modification and variations from the described embodiments exist. More specifically, the following examples are given as a specific illustration of embodiments of the claimed disclosure. It should be understood that the invention is not limited to the specific details set forth in the examples.

What is claimed:

1. A bag assembly for handling effluent from a hydroblasting operation, the bag assembly comprising:

a containment bag comprising:

a throat opening configured to interface with an end of a vessel, a sidewall extending approximately longitudinally from the throat opening, and a sleeve that is (i) formed of a resilient material, (ii) located substantially circumferentially around the containment bag near the throat opening, and (iii) resistant to impingement by hydroblasting fluid directly from a hydroblasting wand;

a drain in the bag configured to enable draining of the fluid collected in the containment bag; and an anti-static means coupled to or within at least one of the sidewall and the sleeve.

2. The bag assembly of claim 1, wherein a proximal end of the sleeve is longitudinally spaced apart from the throat opening to define a sleeveless portion of the sidewall, the sleeveless portion is located between the sleeve and the throat opening and is capable of being inserted over a flange of the vessel.

3. The bag assembly of claim 2, further comprising a drawstring configured for tightening the sleeveless portion of the sidewall on the open end of the vessel.

4. The bag assembly of claim 1, wherein the sleeve is resilient such that it can be substantially folded or rolled for shipping and retain an unfolded circular shape upon installation of the bag assembly onto a vessel.

5. The bag assembly of claim 1, wherein the sidewall is formed from a reinforced polymer sheet.

6. The bag assembly of claim 5, wherein the sleeve is formed of a polymer.

7. The bag assembly of claim 5, wherein the sleeve is located inboard of the reinforced polymer sheet, the reinforced polymer sheet forming an outer wall of the sidewall.

8. The bag assembly of claim 7, wherein the sleeve is located inboard of an outer wall of the sidewall and outboard of an inner sidewall of the reinforce polymer sheet such that the sleeve is sandwiched between opposing layers of the reinforced polymer sheet.

9. The bag assembly of claim 5, wherein the sleeve is flexible.

10. The bag assembly of claim 1, wherein the anti-static means comprises at least a portion of the sidewall being formed from a material comprising an anti-static polymer.

11. An anti-static bag assembly for handling effluent from a hydroblasting operation, the bag assembly comprising:

a containment bag including:

a throat opening configured to interface with an end of a vessel;

a drain in the bag configured to enable draining of the fluid collected in the containment bag; and a sleeve that is (i) formed of a resilient material, (ii) located circumferentially near the throat opening, and (iii) resistant to direct impingement by hydroblasting fluid directly from the hydroblasting wand, and such that the sleeve is located inboard of an outer wall of the sidewall and outboard of an inner sidewall of the reinforced polymer sheet such that the sleeve is sandwiched between opposing layers of the reinforced polymer sheet, and the sleeve being anti-static.

12. The bag assembly of claim 11, wherein the antistatic sidewall includes a grounded conductive wire.

13. The bag assembly of claim 11, wherein the antistatic sidewall includes a grounded metal foil.

14. The bag assembly of claim 11, wherein the antistatic sidewall includes an anti-static coating.

15. The bag assembly of claim 11, wherein the antistatic sleeve is formed of a material comprising an anti-static polymer.

*16. A containment bag assembly for handling effluent from a hydroblasting operation of a vessel, the bag assembly comprising:*

*a containment bag body including a throat portion and a sidewall;*

*the throat portion forming an open end in the containment bag body, the throat portion being adapted to interface with an end of the vessel;*

*the sidewall being adapted to be resistant to direct impingement by hydroblasting fluid during the hydroblasting operation;*

*an anti-static means coupled to or within the sidewall; and*

*a drain in the containment bag body adapted to enable draining of the fluid collected in the containment bag body;*

*wherein the containment bag body is adapted for being flexible such that the containment bag is capable of (i) being folded or rolled for shipping and (ii) retaining a cross-sectional shape of the vessel over at least a portion of the containment bag body upon installation of the containment bag body on the vessel.*

*17. The containment bag assembly of claim 16 whereby the containment bag body is adapted for retaining the cross-sectional shape of the vessel during the hydroblasting operation.*

*18. The containment bag assembly of claim 17 wherein the containment bag body has a closed end opposite the open end of the containment bag body.*

*19. The containment bag assembly of claim 17 wherein the containment bag body being capable of retaining the cross-sectional shape of the vessel enables the containment bag assembly to be unsupported at the closed end of the containment bag body.*

*20. The containment bag assembly of claim 17 wherein the containment bag body being capable of retaining the cross-sectional shape of the vessel enables the containment bag assembly to be unsupported by support means.*

*21. The containment bag assembly of claim 17 wherein the cross-sectional shape of the vessel is circular.*

*22. The containment bag assembly of claim 17 wherein the cross-sectional shape of the vessel is rectangular.*

*23. The containment bag assembly of claim 17 wherein the closed end is formed by a single seam that is formed in a single line affixing sides of the containment bag body together.*

*24. The containment bag assembly of claim 17 wherein the containment bag body includes a sidewall and a sleeve.*

*25. The containment bag assembly of claim 17 wherein the containment bag body is a poly membrane.*

*26. The containment bag assembly of claim 25 wherein the poly membrane has a thickness between 12 and 80 mil.*

* * * * *